United States Patent Office 2,957,024
Patented Oct. 18, 1960

2,957,024

METHYL α-(TRIFLUOROMETHYL) ACRYLATE DIMER AND METHOD FOR MAKING SAME

Harry D. Anspon, Paducah, Ky., and Joseph J. Baron, Jr., Easton, Pa., assignors to General Aniline & Film Corporation, New York, N.Y., a corporation of Delaware No Drawing. Filed Aug. 18, 1958, Ser. No. 755,383

7 Claims. (Cl. 260—485)

This invention relates to a dimer of methyl α-(trifluoromethyl) acrylate and a method for making said dimer.

It has been repeated that methyl α-(trifluoromethyl) acrylate forms polymers with various catalysts. Thus, it has been stated that free radical polymerizations of this compound with benzoyl peroxide or 2,2'-azobis(2-methylpropionitrile) give rise to polymeric products. All attempts to prepare such products employing these catalysts have failed to yield any polymer product. Triethyl phosphite and tri-n-butyl phosphine have also been suggested as catalysts for this polymerization, but procedures employing same have failed to yield any change in monomeric material. We have succeeded in preparing polymers of methyl α-(trifluoromethyl) acrylate employing gamma radiation whereby a hard, colorless, transparent, solid polymeric material is obtained. Such a product and procedure is disclosed in our copending application Serial No. 755,419, filed August 18, 1958. In contradistinction to the formation of high polymeric products from methyl α-(trifluoromethyl) acrylate employing the aforementioned catalytic agents, we have succeeded in preparing a dimer of methyl α-(trifluoromethyl) acrylate when employing the free radical catalytic agents.

The dimer of methyl α-(trifluoromethyl) acrylate has a molecular weight of 300 as determined in benzene by freezing point lowering technique, and has a boiling point of 28° C. at 12 mm. pressure. The dimer has outstanding utility as a plasticizer for fluorine containing polymers, and especially for methyl α-fluoro acrylate polymer, methyl trifluoro acrylate, and methyl α-(trifluoromethyl) acrylate polymer.

The general procedure for the preparation of the methyl α-(trifluoromethyl) acrylate dimer involves contact of the acrylate monomer with catalytic amounts of the free radical catalysts. Such amounts range from about 0.05% to about 1% by weight based on the weight of the acrylate. The preferred range of catalyst is from 0.1% to 0.5% by weight. The free radical type catalysts which are contemplated for use in the present invention include the usual organic peroxides such as benzoyl peroxide, dibenzoyl peroxide, and the like, and 2,2'-azobis(2-methylpropionitrile). The formation of the dimer is achieved by heating a mixture of the acrylate and the catalyst at temperatures from about 40° C. to 90° C., and preferably from 50 to 60° C. for extended periods of time of from about 50 to 250 hrs. The dimerization appears to be accelerated by conducting the heating in the presence of sunlight and/or ultra-violet radiation. When such energy sources are employed, the dimerization is accomplished in shorter periods of time than in the absence thereof.

The following examples will serve to illustrate the present invention without being deemed limitative thereof.

*Example 1*

To 100 g. of methyl α-(trifluoromethyl) acrylate there is added 0.2% benzoyl peroxide. A clear solution results. This solution is held at a temperature of 55° C. for 5 days and then exposed to a source of ultra-violet radiation for 5 additional days. The solution is then fractionally distilled, and there is obtained a fraction boiling at 28° C. at a pressure of 12 mm. which has a molecular weight of about 300. The resultant liquid analyzes as a dimer of methyl α-(trifluoromethyl) acrylate.

*Example 2*

The procedure of Example 1 is repeated except that the catalyst employed is 2,2'-azobis(2-methylpropionitrile) in an amount of 0.2% by weight based on the weight of the acrylate monomer. A similar fraction of dimer is obtained as in Example 1.

*Example 3*

Example 1 is repeated employing 0.1% by weight of benzoyl peroxide catalyst. Before exposure to the ultra-violet radiation, the monomer solution is held at 60° C. for 10 days. A similar dimer fraction is obtained as in Example 1.

Other variations in and modifications of the described processes which will be obvious to those skilled in the art can be made in this invention without departing from the scope or spirit thereof.

We claim:

1. A process for the preparation of methyl α-(trifluoromethyl)acrylate dimer which comprises heating a mixture of methyl α-(trifluoromethyl)acrylate and a free radical catalyst selected from the group consisting of organic peroxide catalyst and 2,2'-azobis(2-methylpropionitrile) to a temperature of from about 40° C. to about 90° C. and in the presence of ultra-violet radiation for a time sufficient to effect dimerization of the methyl α-(trifluoromethyl)acrylate.

2. A process for the preparation of methyl α-(trifluoromethyl)acrylate dimer which comprises heating a mixture of methyl α-(trifluoromethyl)acrylate and from about 0.05% to about 1% by weight based on the weight of the acrylate of an organic peroxide to a temperature of about 50° C. and in the presence of ultra-violet radiation for a time sufficient to effect dimerization of the methyl α-(trifluoromethyl)acrylate.

3. A process for the preparation of methyl α-(trifluoromethyl)acrylate dimer which comprises heating a mixture of methyl α-(trifluoromethyl)acrylate and from about 0.1% to about 0.5% by weight based on the weight of the acrylate of benzoyl peroxide to a temperature of about 50° C. and in the presence of ultra-violet radiation for at least about 50 hrs. whereby dimerization of the acrylate is effected.

4. A process for the preparation of methyl α-(trifluoromethyl)acrylate dimer which comprises heating a mixture of methyl α-(trifluoromethyl)acrylate and about 0.2% benzoyl peroxide to a temperature of 55° C. and in the presence of ultra-violet radiation for about 5 days.

5. A process for the preparation of methyl α-(trifluoromethyl)acrylate dimer which comprises heating a mixture of methyl α-(trifluoromethyl)acrylate and about 0.2% 2,2'-azobis(2-methylpropionitrile) to a temperature of 55° C. and in the presence of ultra-violet radiation for about 5 days.

6. A process for the preparation of methyl α-(trifluoromethyl)acrylate dimer which comprises heating a mixture of methyl α-(trifluoromethyl)acrylate and from about 0.1% to about 0.5% by weight based on the weight of the acrylate of benzoyl peroxide to a temperature of about 50° C. for at least about 50 hrs. whereby dimerization of the acrylate is effected, and isolating the resulting dimer from the said reaction mixture by distillation, the said dimer having a boiling point of about 28° C. at a pressure of about 12 mm. of mercury.

7. Methyl α-trifluoromethyl)acrylate dimer.

References Cited in the file of this patent

UNITED STATES PATENTS

| | | |
|---|---|---|
| 2,232,785 | Howk | Feb. 25, 1941 |
| 2,244,487 | Crawford | June 3, 1941 |
| 2,244,645 | Jacobsen | June 3, 1941 |
| 2,472,811 | Dickey | June 14, 1949 |
| 2,559,855 | Dickey et al. | July 10, 1951 |
| 2,652,393 | Dickey et al. | Sept. 15, 1953 |
| 2,675,372 | Coover et al. | Apr. 13, 1954 |
| 2,843,576 | Dunn et al. | July 15, 1958 |

UNITED STATES PATENT OFFICE
CERTIFICATION OF CORRECTION

Patent No. 2,957,024                      October 18, 1960

Harry D. Anspon et al.

It is hereby certified that error appears in the above numbered patent requiring correction and that the said Letters Patent should read as corrected below.

Column 1, line 17, for "repeated" read -- reported --.

Signed and sealed this 13th day of June 1961.

(SEAL)
Attest:

ERNEST W. SWIDER
Attesting Officer

DAVID L. LADD
Commissioner of Patents